*Edwin W. Newton's Submarine Telegraph Cable.*

[31.]

119,093.

Patented Sep. 19, 1871.

Inventor,

Edwin W. Newton.

Witnesses:

Fannie M. Newton.
Susie Gregg.

119,093

UNITED STATES PATENT OFFICE.

EDWIN W. NEWTON, OF FRANKLIN GROVE, ILLINOIS.

IMPROVEMENT IN SUBMARINE TELEGRAPH-CABLES.

Specification forming part of Letters Patent No. 119,093, dated September 19, 1871.

*To all whom it may concern:*

Be it known that I, EDWIN W. NEWTON, of Franklin Grove, in the county of Lee and State of Illinois, have invented a form of Submarine Telegraph Cable, of which the following is a specification:

The object of my invention is to furnish a cable which shall be cheaper, more simple, and rapid in construction than any now in use; which, with a minimum of material and bulk, shall combine great tensile strength, and shall have perfect and durable insulation, not only against the action of water but also the strains and rubbings or bruises to which it will be liable on the bottom of the ocean. I accomplish these objects by using a copper conductor covered with a thin envelope of insulating material, preferably of glass in whole or part, and inclosing the whole in a tube of solid wrought-iron, which shall be continuous the whole length of the cable, without any openings or joinings of any kind but welded ones.

Figure 1:
Figure 2:

Figure 1 is a longitudinal section of the cable. Fig. 2 is a transverse section of the same.

C is the copper conducting-wire, composed of one or more strands, as may be desired. G is a tube or envelope of glass, or glass combined with other insulating material, which surrounds the copper conductor and insulates it from the iron covering. I is a tube of iron, which contains the others, gives the cable its strength, and is the real insulator from the water.

The first step in the construction is to cover the copper conductor with the glass insulator. This may be done by covering the wire with a mixture of powdered glass mixed with gum or other adhesive material. The wire can be passed continuously through a bath of the mixture, so that it may adhere to the wire as paint would. The solvent of the gum should be a quick drier, so that it may set quickly after exposure to the air. Or the wire may be passed through a bath of melted glass, which will adhere to it and coat it, so as to form an insulator when cooled. In either case the glass should become soft and pasty at the welding heat of iron. The iron tube will be formed from a ribbon of iron of any desired thickness, and of such width that, when formed into a tube and welded by a butt-weld, after the manner of making gas-pipe, it shall just contain the copper and glass. It will be formed into a tube by being passed through a series of grooved rollers. By means of proper furnace arrangements placed between the sets of rollers the iron will be raised to a welding heat while being formed into a trough-shape, and should be sprinkled with calcined borax or other suitable flux, so as to keep the edges of the iron clean and fit for welding when brought into contact. This flux should be applied in sufficient quantity also to cover the inside of the tube and form a glassy coating when cooled. At this moment, when the iron is of a trough or semicircular-shape, at a welding heat, and covered on its edges and inside with the melted flux, the copper wire, covered with its coating of glass, will approach it moving in nearly the same direction as the iron, being moved and guided by appropriate rollers or pulleys, so as to make with the iron an acute angle, and will drop into the trough, when the whole will pass through sets of rollers that will complete the tube of iron and weld it by pressure. If gum were used in preparing the copper wire for insulation it would all burn out as soon as it came in contact with the hot iron. At the moment of welding, the glass on the copper would be firm enough to resist the moderate pressure and support the edges of the iron, thereby insuring an accurate joint and perfect welding. But the heat of the iron would soften this glass so that it would combine with the flux on the inside of the iron, the two together making a perfect tube of glass and completely filling the space between the copper and the iron; consequently it would do no harm if the glass should be cracked by the subsequent bending of the cable, as no particle of it could get out of its place, and it would completely insulate the copper from the iron, which is its whole object. Instead of using glass only, as just described, the insulator may be partly formed of other materials. The conducting-wire could first be wound with linen or cotton yarn in the ordinary manner of insulating with such materials. This should then be rendered non-combustible by being saturated and coated thoroughly with silicate of soda or soluble glass. An insulator thus prepared would bear contact with the hot iron for a few seconds without injury, until the iron could be welded; it would also be firm enough to bear the pressure of the iron while welding, immediately after which the heat of the iron would be reduced by the application of water. The flux on the iron would combine with the partially-softened silicate of soda in this method also, thus insuring a perfect insulator around the copper conductor. Or vulcanized rubber or gutta percha could be used instead of the yarn wrapping; the other steps of the process of manufacture remaining as described. Even if, in any case, the organic materials of the insulator should be partially decomposed by the heat of the iron, the extent of such decomposition would be very slight in the short interval between the welding and the cooling by water immediately after it; and since the gas so formed could not escape from the tube it would do no harm, but would be a perfect insulating material itself. Of course this whole process of manufacture would be continuous, the movements of the rollers and the wires being controlled by proper machinery. The cable could then be coated with any kind of preservative paint or mixture to prevent the corroding action of sea-water upon the iron. The cable when finished should not exceed three-eighths of an inch in diameter.

I claim as my invention—

1. A telegraph-cable formed of the three parts, a conducting core of copper, an envelope of glass, or glass and other material, and an inclosing continuous iron tube, in the manner and for the purpose described.

2. The process or method by which the glass envelope or insulator is formed on the copper wire and combined with the glass coating on the inside of the iron tube, in the manner and for the purpose described.

EDWIN W. NEWTON.

Witnesses:
FANNIE M. NEWTON,
SUSIE GREGG.

(31.)